(No Model.)  3 Sheets—Sheet 1.
T. L. JONES.
METHOD OF AND MEANS FOR EXHIBITING THE WORDS OR SCORE IN THEATRICAL PERFORMANCES.
No. 268,802.  Patented Dec. 12, 1882.
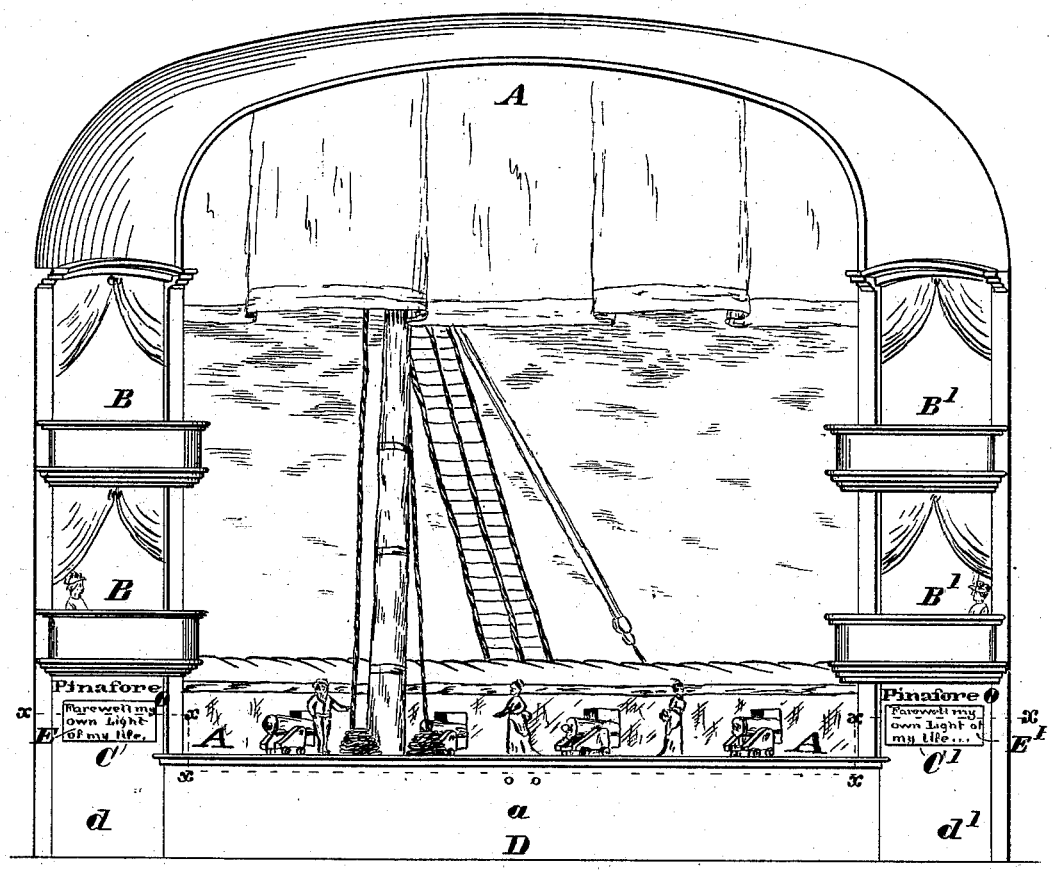
Attest:
Charles Pickles
Solon N. Dapp.
Inventor:
Thomas L. Jones.
by C. D. Moody,
atty.

(No Model.)  3 Sheets—Sheet 2.

T. L. JONES.
METHOD OF AND MEANS FOR EXHIBITING THE WORDS OR SCORE IN THEATRICAL PERFORMANCES.

No. 268,802.  Patented Dec. 12, 1882.

Attest:
Charles Pickles
Solon N. Dapp.

Inventor:
Thomas L. Jones
by C. D. Moody,
atty.

(No Model.) 3 Sheets—Sheet 3.
T. L. JONES.
METHOD OF AND MEANS FOR EXHIBITING THE WORDS OR SCORE IN THEATRICAL PERFORMANCES.
No. 268,802. Patented Dec. 12, 1882.
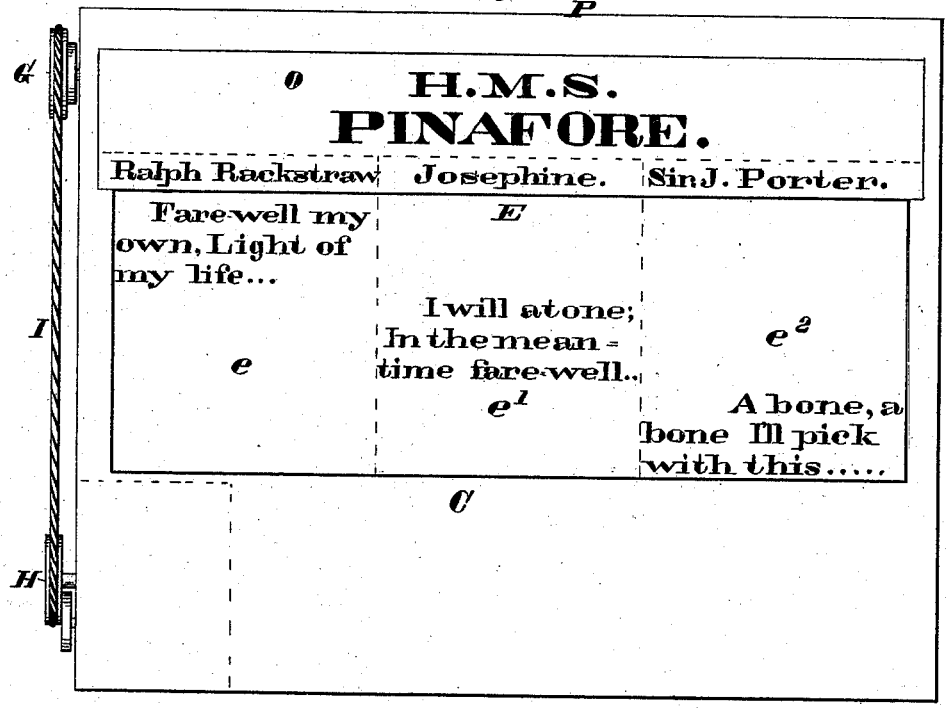
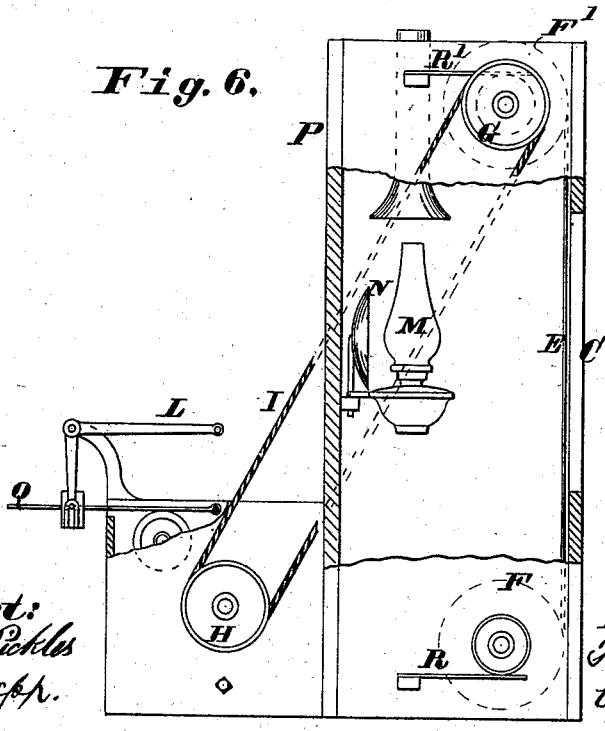
Attest:
Charles Pickles
Solon U. Dapp.
Inventor:
Thomas L. Jones
by C. D. Moody
atty.

UNITED STATES PATENT OFFICE.

THOMAS L. JONES, OF ST. LOUIS, MISSOURI.

METHOD OF AND MEANS FOR EXHIBITING THE WORDS OR SCORE IN THEATRICAL PERFORMANCES.

SPECIFICATION forming part of Letters Patent No. 268,802, dated December 12, 1882.

Application filed August 2, 1881. (No model.)

*To all whom it may concern:*

Be it known that I, THOMAS L. JONES, now of St. Louis, Missouri, have made a new and useful Improvement in Method and Means for Presenting to the Audience the Words or Score of an Opera, Play, or other Exhibition, of which the following is a full, clear, and exact description, reference being had to the annexed drawings, making part of this specification, in which—

Figure 4:
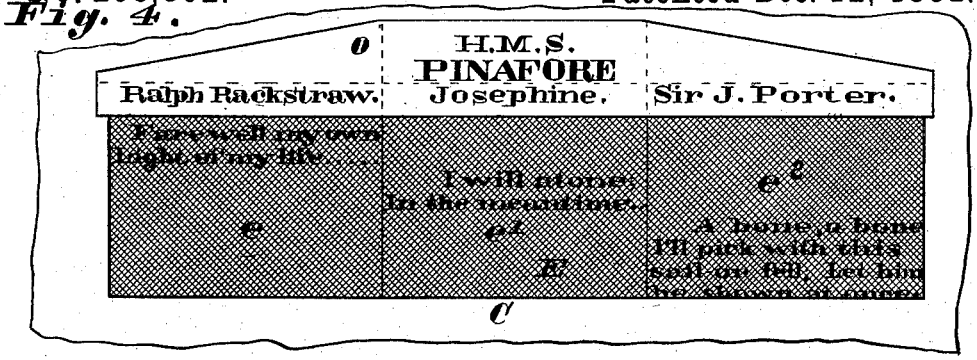
Figure 2:
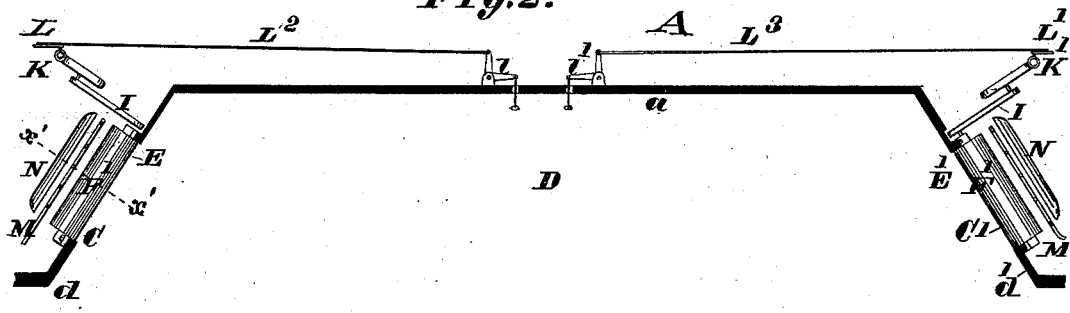
Figure 3:
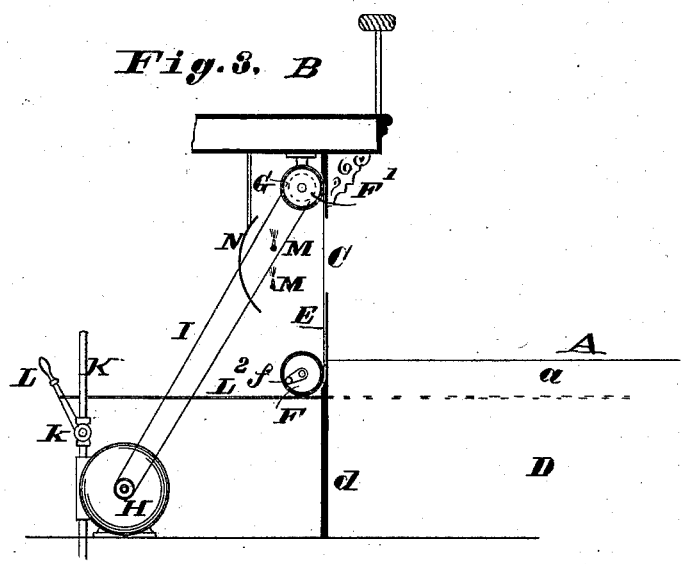

Figure 1 is a front elevation of the stage of a theater having the improvement; Fig. 2, a horizontal section taken on the line $xx$ of Fig. 1; Fig. 3, a vertical section taken on the line $x'x'$ of Fig. 2; Fig. 4, a front elevation, upon an enlarged scale, showing, together with the parts immediately surrounding it, that portion of the libretto-scroll which for the time being appears at the illuminated opening; and Figs. 5 and 6, respectively, a front and a side elevation of a portable form of the device, the side wall in the last-named view being broken away to exhibit the interior of the device.

The same letters denote the same parts.

The present invention is an improvement in librettos or devices for presenting to the audience the words or score of an opera, play, or any form of exhibition where it is desirable to exhibit to the eyes of the persons of the audience the words or other symbols of the utterances of the singers, players, or speakers.

It consists mainly in a movable transparency bearing the words or symbols in question and illuminated by a light in the rear. The transparency moves past an opening which is between the audience and the light, the movement being timed to bring the words, as they are uttered, past the opening, and preferably the center of the opening. Suitable motive mechanism is employed to move the transparency and at any desired rate—that is, the movement can be hastened, slowed, or arrested, according to the requirements of the occasion. The device can be a portable one; but when used in a theater it is better to make it a fixture. In all cases it should be so located as not only not to be in the way of the occupants or the machinery of the stage, but so that the eyes of the spectators can most readily turn from the speaker to the illuminated opening. To this end the latter should be at or near the level of the speaker rather than above or beneath him; and while I do not desire to be confined to any particular location, a very desirable place in a theater for the words to appear seems to be at the sides of the proscenium, just beneath the proscenium-boxes at both sides of the stage, as seen in Figs. 1, 2, 3 of the drawings, where A represents the stage of a theater, of the usual description, saving as modified by the present improvement; and B B B' B', the usual proscenium-boxes. The openings through which the words are exhibited are shown at C C', respectively, at each side of the proscenium D in the walls $d\ d'$, which, as theaters are made, are inclined to the longitudinal axis of the theater.

E represents the transparency, consisting of any material that is transparent and flexible, so that it can be rolled, as a scroll, and upon which the words or symbols can be printed. A very good material for this purpose is the tracing-muslin used by draftsmen. The transparency is held and arranged to be rolled upon the rollers F F', which are arranged respectively below and above the opening C, being at the start preferably arranged upon the lower roller, F, and thence rolled off and upward and onto the upper roller, F'. The roller F is furnished with a crank, $f$, for winding the transparency onto the roller. The upper roller may have a similar crank for a similar purpose. The movement of the transparency past the opening C and onto the roller F' is effected by any suitable mechanism which can be readily controlled. As shown, the shaft of the roller F', by means of the pulleys G H and belt I, is connected with and driven by the motor J, which may be a steam or water engine or other suitable driver. The steam or water supply pipe is shown at K; and L represents a lever connected with the stop-valve $k$. By suitably operating the lever and valve the speed of the movement of the transparency can be regulated. This can be done by an attendant immediately by the motor or at a distance therefrom, it being desirable for the operator of the device to be in a position to see the stage and its occupants. Cords $L^2\ L^3$ therefore may lead from the levers L L' at each side of the stage to the levers *l l'*, and thence through to the front of the wall *a*, where a single person may operate both transparencies E E'. It is desirable to be able to control each transparency separately, and hence the cords L² L³ are not connected.

I do not wish to be confined to any special mode of regulating the speed of the transparency past the opening C, as the means for accelerating, retarding, and checking the movement of the transparency must vary according to the kind and position of the motor used to move the transparency.

The transparency is illuminated by a suitable light—such as the gas-jets M, aided by the reflector N. By arranging the device, as shown, behind the proscenium-walls *d d'*, the light is not thrown upon the stage, so as to interfere with the action of the stage-lights. This position of the transparency is also desirable in that the players or speakers upon the stage are enabled to see the transparency and utilize it as a prompter. For this reason, but more especially for the convenience of the audience, it is very desirable to use two of the transparencies in connection with a theater, in order that persons in any part of the stage or house may readily see the words.

A desirable arrangement of the words upon the transparency is shown in Figs. 4, 5—that is, in columns *e e' e²*, the number of the columns corresponding to the number of the principal characters appearing in the play. Above the opening C, and respectively above the columns *e e' e²*, and in any suitable manner, as upon a card or sign, O, the names of the characters are posted. The card or sign remains during the play as a fixture. As the utterances of the various characters are made the words appear beneath the respective names upon the sign O, thus readily directing the attention of the spectators to the proper characters.

To illustrate the working of the device, a scene from the opera Pinafore is introduced. In Figs. 4, 5 the transparency is adjusted as when Ralph Rackstraw has just sung the words "Farewell," &c., in column *e*, and Josephine is about to sing the words "I will atone," &c., beneath her name in column *e'*. By the time she will have ended the transparency will have moved upward to bring the words "A bone," &c., into view in column *e²* beneath the name of "Sir J. Porter," and so on.

In Figs. 5 and 6 the device is shown in a portable form—the transparency, the rollers, the light, and reflector—and, if desired, the motive mechanism being contained in a case, P. The movement is regulated by the brake Q. The motor may be a spring, or the transparency may be operated by an attendant immediately by the device, the transparency-rollers for such purpose being furnished with suitable appliances, by means of which the attendant imparts the rotation to the rollers.

R R' represent friction-brakes, which bear upon the roller-shafts or pulleys on the roller-shafts, and serve, by keeping the rollers from rotating too easily, to keep the transparency properly in place upon the rollers. This last-described form of the device can, when used, be placed at or near the front of the center of the stage.

The words printed upon the transparencies E or E' need not necessarily be in the same language as that spoken or used by the actors or singers. They, for instance, may speak or sing in the Italian language, while the words on the transparencies may be English. In fact, one of the principal advantages of the present improvement is that by means of it the utterances of an actor or singer using a foreign language may be interpreted in a language familiar to the audience.

A further advantage growing out of the use of the two transparencies E and E' in conjunction is that one language can be used upon one transparency and another language upon the other transparency.

I claim—

1. The herein-described libretto, consisting of an illuminated transparency bearing the words or other symbols of the utterances of the singers, players, or speakers, and adapted to move past an opening between the audience and the light.

2. The combination of the stage A, the wall *d*, having the opening C, and the illuminated transparency E, for the purpose described.

3. The combination of the stage A, the walls *d d'*, having respectively the openings C and C', and the illuminated transparencies E E', for the purpose described.

4. The combination of the opening C, the wall *d*, the illuminated transparency E, and the rollers F F', substantially as described.

5. The combination of the opening C, the wall *d*, the illuminated transparency E, and the rollers F F', said transparency being moved upon said rollers by means of a suitable motor, the rate of which can be regulated, for the purpose described.

6. In combination with a stage, A, and a movable illuminated transparency, E, the levers L L', cords L² L³, levers *l l'*, and wall *a*, said levers L L' being connected with and controlling the movement of the motor driving or moving said rollers and transparency, substantially as described.

7. The combination of the opening C, the wall *d*, the movable transparency E, the rollers F F', and the light M, substantially as described.

8. The combination of the stage A, the wall *d*, having the opening C, the movable transparency E, and the light M, substantially as described.

9. The combination of the opening C, the wall *d*, the movable transparency or scroll E, having the columns *e e' e²*, and the sign O, substantially as described.

10. The combination of the stage A, the scroll E, the rollers F F', and the brakes R R', substantially as described, and for the purpose set forth.

11. In combination with a theater-stage, an illuminated libretto, said libretto being arranged at the side or sides of the stage, for the purpose described.

12. The improvement in theater appliances, consisting in a movable libretto-scroll, said scroll being upon or in the vicinity of the stage and in the general view of the spectators, for the purpose described.

13. The combination of a theater-stage and an illuminated transparent libretto-scroll, for the purpose named.

14. The combination of a theater-stage and an illuminated libretto, said libretto being upon or in the vicinity of the stage and in the general view of the spectators, for the purpose named.

THOS. L. JONES.

Witnesses:
 CHAS. D. MOODY,
 CHARLES PICKLES.